United States Patent
He et al.

(10) Patent No.: US 10,262,626 B2
(45) Date of Patent: Apr. 16, 2019

(54) ELECTRONIC INTERACTIVE SYSTEM AND SETTING METHOD THEREOF

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Jianzi He, Beijing (CN); Jianting Wang, Beijing (CN); Junning Su, Beijing (CN); Peng Cheng, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 196 days.

(21) Appl. No.: 15/307,899

(22) PCT Filed: May 11, 2016

(86) PCT No.: PCT/CN2016/081632
§ 371 (c)(1),
(2) Date: Oct. 31, 2016

(87) PCT Pub. No.: WO2017/143663
PCT Pub. Date: Aug. 31, 2017

(65) Prior Publication Data
US 2018/0040293 A1    Feb. 8, 2018

(30) Foreign Application Priority Data
Feb. 25, 2016  (CN) .......................... 2016 1 0105811

(51) Int. Cl.
*G09G 5/00*    (2006.01)
*G06F 3/041*   (2006.01)
*G06F 3/14*    (2006.01)

(52) U.S. Cl.
CPC ............. *G09G 5/006* (2013.01); *G06F 3/041* (2013.01); *G06F 3/1454* (2013.01);
(Continued)

(58) Field of Classification Search
CPC ...... G06F 3/041; G06F 3/1454; G06F 3/1462; G09G 5/005; G09G 5/006; G09G 2354/00;
(Continued)

(56) References Cited

U.S. PATENT DOCUMENTS

2008/0309646 A1  12/2008  Liu
2012/0062519 A1  3/2012   Holtzman et al.
2015/0208050 A1* 7/2015   Pawlak ................ H04N 9/3194
                                              348/189

FOREIGN PATENT DOCUMENTS

CN    101324804 A    12/2008
CN    201340598 Y    11/2009
(Continued)

OTHER PUBLICATIONS

International Search Report and Written Opinion dated Jun. 28, 2016; PCT/CN2016/081632.

*Primary Examiner* — Stacy Khoo
(74) *Attorney, Agent, or Firm* — Ladas & Parry LLP

(57) ABSTRACT

An electronic interactive system and a setting method thereof. The electronic interactive system includes a wireless transmission unit respectively connected with an electronic terminal device and an electronic whiteboard, where the wireless transmission unit is configured to transmit data signals from the electronic terminal device to the electronic whiteboard in a wireless form and transmit touch signals from the electronic whiteboard to the electronic terminal device in the wireless form.

14 Claims, 4 Drawing Sheets

(52) U.S. Cl.
CPC ........... *G06F 3/1462* (2013.01); *G09G 5/005* (2013.01); *G09G 2354/00* (2013.01); *G09G 2370/06* (2013.01); *G09G 2370/12* (2013.01); *G09G 2370/16* (2013.01)

(58) Field of Classification Search
CPC ........... G09G 2370/06; G09G 2370/12; G09G 2370/16
See application file for complete search history.

(56) References Cited

FOREIGN PATENT DOCUMENTS

| | | |
|---|---|---|
| CN | 202584073 U | 12/2012 |
| CN | 203054791 U | 7/2013 |
| CN | 203224859 U | 10/2013 |

\* cited by examiner

ELECTRONIC INTERACTIVE SYSTEM AND SETTING METHOD THEREOF

TECHNICAL FIELD

Embodiments of the present disclosure relate to an electronic interactive system and a setting method thereof in the field of display technology.

BACKGROUND

An electronic whiteboard is developed from a common whiteboard. The electronic whiteboard may perform information communication with a computer. For instance, when the electronic whiteboard is connected to the computer, the content on the computer may be displayed on a screen of the electronic whiteboard; and a meeting or teaching environment with a large-screen display may be created to facilitate demonstration or explanation for a user.

After a conventional electronic whiteboard is connected to a computer, during the demonstration or explanation of the user before the electronic whiteboard, if it is needed to switch a page displayed on the electronic whiteboard to a next page or to open other documents stored in the computer, the user needs to return back to the computer and perform corresponding operations on the computer so as to achieve the switching of the display content. Thus, the user may need to frequently go back and forth between the electronic whiteboard and the computer during the demonstration or explanation. Therefore, the operation can be cumbersome; the time can be wasted; the use experience of the whiteboard for the user can be affected; and the participation effect of participants can be hindered.

In addition, most electronic whiteboards are in a wired connection with the computer, causing spatial positions of the electronic whiteboard and the computer to be limited, and hence use of the whiteboard is inconvenient. Moreover, as a connecting cable between the electronic whiteboard and the computer tends to be damaged, the information communication between the electronic whiteboard and the computer can be blocked, and hence normal display cannot be achieved.

SUMMARY

Embodiments of the present disclosure provide an electronic interactive system and a setting method thereof. The electronic interactive system and the setting method are capable of achieving wireless connection between an electronic whiteboard and an electronic terminal device, so that the electronic whiteboard can display documents in the electronic terminal device without spatial limitation. Moreover, the electronic whiteboard has touch function, so that the user can control the electronic terminal device by touching the electronic whiteboard.

Embodiments of the present disclosure provide an electronic interactive system, which includes a wireless transmission unit respectively connected with an electronic terminal device and an electronic whiteboard, where the wireless transmission unit is configured to transmit data signals from the electronic terminal device to the electronic whiteboard in a wireless form and transmit touch signals from the electronic whiteboard to the electronic terminal device in the wireless form.

Embodiments of the present disclosure provide a setting method of an electronic interactive system, including:

connecting a first RF transmission module and a first RF receiving module in a first RF transmission group to an electronic terminal device and an electronic whiteboard respectively via data cables of a first type, wherein an operating system of the electronic terminal device and an operating system of the electronic whiteboard each include a HID protocol, so that data signals of the electronic terminal device are transmitted to the electronic whiteboard in the form of RF; and connecting a second RF transmission module and a second RF receiving module in a second RF transmission group to the electronic whiteboard and the electronic terminal device respectively via data cables of a second type, so that touch signals of the electronic whiteboard are transmitted to the electronic terminal device in the form of RF, and mutual control of the electronic whiteboard and the electronic terminal device are achieved.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings without making any other inventive work.

Figure 1:
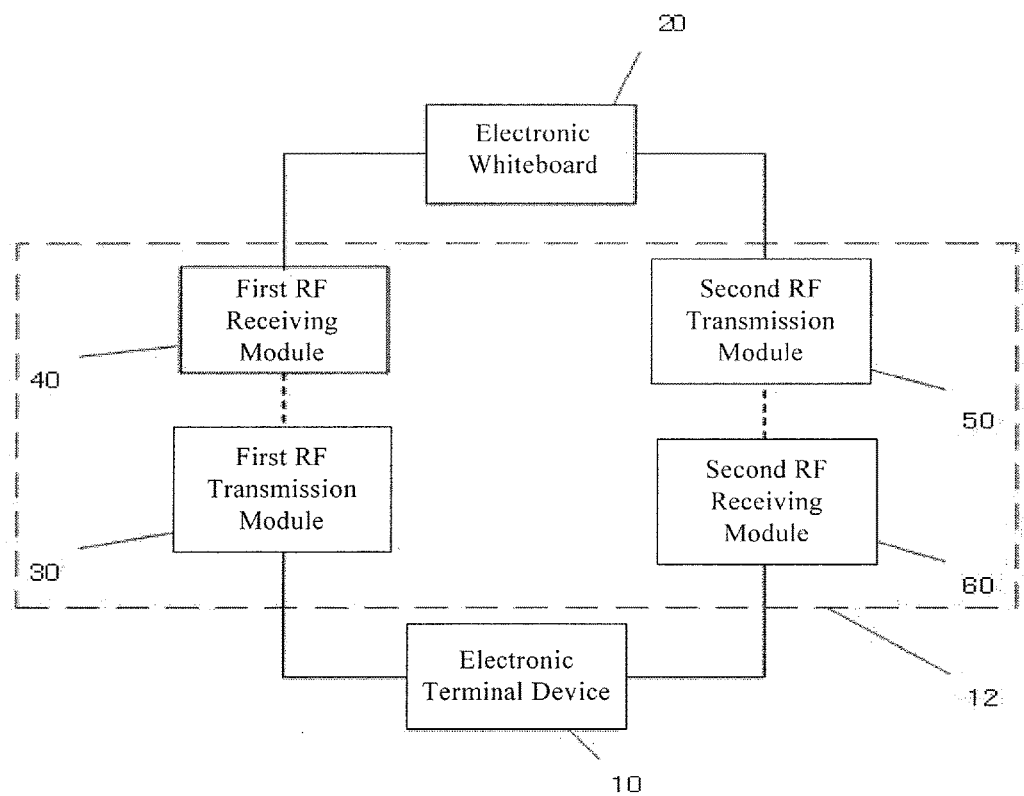
FIG. 1 is a schematic composition diagram of an electronic interactive system provided by an embodiment of the present disclosure.

Reference numerals of the accompanying drawings:

10. Electronic Terminal Device; 12. Wireless Transmission Unit; 20. Electronic Whiteboard; 21. Display Module; 22. Power Amplifier Module; 23. Touch Module; 24. Processing Module;

30. First RF Transmission module; 31. Audio and Video Decoder; 32. Signal Modulator; 33. First Signal Transmitter; 40. First RF Receiving Module; 41. First Signal Receiver; 42. Signal Demodulator; 43. Audio and Video Encoder;

50. Second RF Transmission module; 51. Data Acquisition unit; 52. First Data Processor; 53. Second Signal Transmitter;

60. Second RF Receiving Module; 61. Second Signal Receiver; 62. Second Data Processor; 63. Universal Serial Bus (USB) Communicator.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. The drawings mentioned in the embodiments of the present disclosure are only to exemplarily illustrate the technical solutions of the present disclosure. The other drawings obtained from the drawings of the embodiments of the present disclosure through simple transformations should be within the scope of the present disclosure.

Embodiments of the present disclosure provide an electronic interactive system. The electronic interactive system can achieve wireless connection between an electronic whiteboard and an electronic terminal device. Moreover, the electronic whiteboard has touch function.

FIG. 1 is a schematic composition diagram of an electronic interactive system provided by an embodiment of the present disclosure. As illustrated in FIG. 1, the electronic interactive system comprises an electronic terminal device 10, an electronic whiteboard 20 and a wireless transmission unit 12, where the electronic terminal device 10 and the electronic whiteboard 20 adopt a matched human interface device (HID) protocol, and the wireless transmission unit 12 is configured to transmit touch signals of the electronic whiteboard 20 to the electronic terminal device 10 in a wireless form, so as to achieve the image display of the electronic terminal device 10 on the electronic whiteboard 20 and to achieve the control of the electronic terminal device 10 by the electronic whiteboard 20.

An HID protocol is an interactive protocol of a driver of an operating system. Thus, in the wireless transmission unit 12, data signals are only needed to be set in a signal transmission format that matches (or is compatible to) the HID protocol, and hence a program basis is created for achieving the wireless transmission of the data signals between the electronic terminal device 10 and the electronic whiteboard 20.

For instance, the wireless transmission unit 12 includes a first RF transmission group and a second RF transmission group, where the first RF transmission group includes a first RF transmission module 30 and a first RF receiving module 40, and the second RF transmission group includes a second RF transmission module 50 and a second RF receiving module 60.

The first RF transmission module 30 is connected with the electronic terminal device 10 and configured to send data signals of the electronic terminal device 10 to the first RF receiving module 40 in the form of RF; and the first RF receiving module 40 is connected with the electronic whiteboard 20 and configured to receive the data signals sent by the first RF transmission module 30 and to transmit the received data signals to the electronic whiteboard 20. The data signals here include an audio data signal, a video data signal, an image data signal and/or other data signals. For instance, the electronic whiteboard 20 plays corresponding audio or video data according to the received audio data signal or the received video data signal. Or, the electronic whiteboard 20 performs corresponding image display according to the received image data signal.

The second RF transmission module 50 is connected with the electronic whiteboard 20 and configured to send touch signals transmitted from the electronic whiteboard 20 to the second RF receiving module 60 in the form of RF; and the second RF receiving module 60 is connected with the electronic terminal device 10 and configured to receive the touch signals transmitted from the electronic whiteboard 20 and then to transmit the received touch signals to the electronic terminal device 10. The electronic terminal device 10 executes corresponding operations according to the received touch signals. The operations here may include the switching of a page displayed on the electronic whiteboard 20 to another page, the opening of other documents and/or the like. For instance, the touch operations of the user on the electronic whiteboard 20 may be equivalent to operations of the user on the computer via a mouse.

Figure 2:
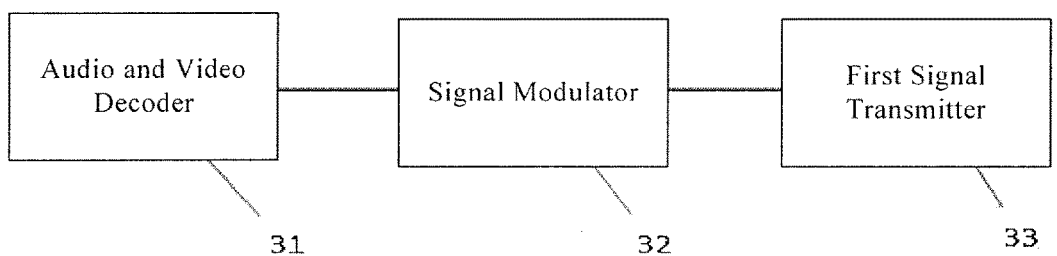
FIG. 2 is a schematic composition diagram of a first radio frequency (RF) transmission module in an embodiment of the present disclosure.

In order to send out the audio data signals, the video data signals or other data signals of the electronic terminal device 10 in the form of RF, FIG. 2 is a schematic composition diagram of the first RF transmission module 30. As illustrated in FIG. 2, the first RF transmission module 30 may include an audio and video decoder 31, a signal modulator 32 and a first signal transmitter 33. The audio and video decoder 31 is connected with the electronic terminal device 10, and configured to convert the audio data signals of the electronic terminal device 10 into the signal form of Inter-IC Sound (I2S) needed by the signal modulator 32 and/or convert the video data signals into the signal form of transistor-transistor logic (TTL) needed by the signal modulator 32, and to transmit the converted data signals to the signal modulator 32. The signal modulator 32 is configured to modulate the video data signals in the signal form of TTL and/or the audio data signals in the signal form of I2S, and to transmit the modulated data signals to the first signal transmitter 33. The first signal transmitter 33 is configured to send the modulated audio data signals and the modulated video data signals to the first RF receiving module 40 in the form of RF.

The TTL signal form is one form of the video data signals and can achieve the synchronous high-speed transmission of the video data signals between devices. The I2S signal form is a signal form of digital audio data and can achieve the synchronous high-speed transmission of the audio data signals between devices. For instance, I2S is a bus standard for the transmission of audio data between digital audio devices, and can transmit clock signals and data signals along independent wires; by separating clock signals and data signals, I2S can avoid distortion induced by time difference.

For instance, the audio and video decoder 31 and the signal modulator 32 may be achieved by software, hardware and/or the combination of software and hardware. For instance, the audio and video decoder 31 and the signal modulator 32 may be achieved by a programmable logic device (e.g., a field programmable gate array (FPGA)), an application specific integrated circuit (ASIC), a digital signal processor (DSP) and/or other circuit boards and chips. The first signal transmitter 33 may include an antenna or other RF signal transmitters. Moreover, for instance, the first RF transmission module 30 may also include a processor (e.g., a central processing unit (CPU)), a memory, etc.

The processor may process data signals and may include various computing architectures such as a complex instruction set computer (CiSC) architecture, a reduced instruction set computer (RISC) architecture or an architecture for implementing a combination of multiple instruction sets. The memory may store instructions and/or data executed by the processor. The instructions and/or data may include codes which are configured to achieve some functions or all the functions of one or more devices in the embodiments of the present disclosure. For instance, the memory includes a dynamic random access memory (DRAM), a static random access memory (SRAM), a flash memory, an optical memory or other memories well known to those skilled in the art.

Figure 3:
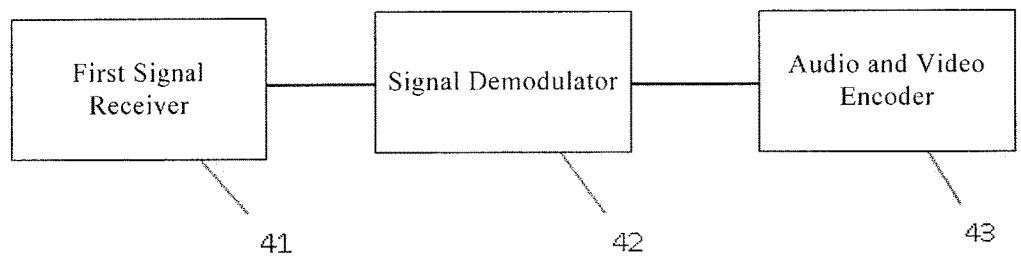
FIG. 3 is a schematic composition diagram of a first RF receiving module in an embodiment of the present disclosure.

For the electronic whiteboard 20 to receive the data signals sent by the first RF transmission module 30, the electronic whiteboard 20 is connected with the first RF receiving module 40. FIG. 3 is a schematic composition diagram of the first RF receiving module 40. As illustrated in FIG. 3, the first RF receiving module 40 includes a first signal receiver 41, a signal demodulator 42 and an audio and video encoder 43. The first signal receiver 41 is configured to receive the audio data signals and the video data signals of the electronic terminal device 10 sent by the first RF transmission module 30 in the form of RF, and transmit the received data signals to the signal demodulator 42. The signal demodulator 42 is configured to demodulate the audio data signals and the video data signals and to transmit the demodulated data signals to the audio and video encoder 43. The audio and video encoder 43 is connected with the electronic whiteboard 20, and configured to encode the demodulated audio data signals and the demodulated video data signals and send the data signals to the electronic whiteboard 20. The electronic whiteboard 20 can play corresponding audio data and video data after receiving the audio data signals and the video data signals. For instance, the audio and video encoder 43 may execute operations opposite to those of the audio and video decoder 31. The signal demodulator 42 may execute operations opposite to those of the signal modulator 32. Moreover, for instance, the audio and video encoder 43 and the audio and video decoder 31 may be combined into an audio and video decoder-encoder. The signal demodulator 42 and the signal modulator 32 may be combined into a signal modulator-demodulator (modem).

In order to achieve the high-efficiency and high-quality transmission of the audio data signals and the video data signals from the electronic terminal device 10 to the electronic whiteboard 20, any one of a high-definition multimedia interface (HDMI) data cable, a display port (DP) data cable and a video graphics array (VGA) data cable may be adopted for the connection between the first RF transmission module 30 and the electronic terminal device 10 and between the first RF receiving module 40 and the electronic whiteboard 20. That is to say, any one of the HDMI data cable, the DP data cable and the VGA data cable may be adopted for the connection between the audio and video decoder 31 and the electronic terminal device 10; and any one of the HDMI data cable, the DP data cable and the VGA data cable may also be adopted for the connection between the audio and video encoder 43 and the electronic whiteboard 20.

The HDMI data cable and the DP data cable are cables for transmitting high-definition multimedia video signals. The HDMI data cable and the DP data cable can perform high-quality transmission of uncompressed high-definition video and multi-channel audio data, with the highest data transmission rate of 5 Gbps. Meanwhile, the transmission of the audio data signals and the video data signals with best quality can be guaranteed.

When the VGA data cable is used for signal transmission, digital-to-analog conversion and analog-to-digital conversion of signals are needed before signal transmission so as to achieve signal transmission through the VGA data cable.

It should be understood that: when the HDMI data cable, the DP data cable or the VGA data cable is adopted, corresponding HDMI data interfaces, DP data interfaces or VGA data interfaces are set in the electronic terminal device 10 and the electronic whiteboard 20. In addition, the first RF receiving module 40 can be externally connected to or disposed in the electronic whiteboard 20 according to actual needs.

As a matched HID protocol is adopted for the electronic terminal device 10 and the electronic whiteboard 20, the first RF transmission module 30 can send the audio data signals and the video data signals of the electronic terminal device 10 to the first RF receiving module 40 in the form of RF, so that the electronic whiteboard 20 can play corresponding audio data and video data.

Figure 4:
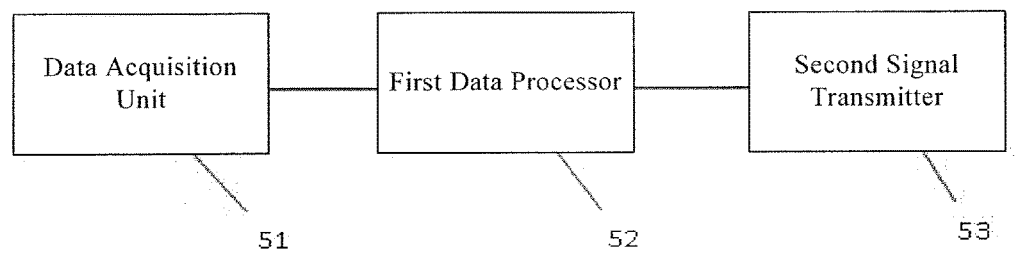
FIG. 4 is a schematic composition diagram of a second RF transmission module in an embodiment of the present disclosure.

For instance, the audio and video encoder 43 and the signal demodulator 42 may be achieved by software, hardware and/or combination of software and hardware. For instance, the audio and video encoder 43 and/or the signal demodulator 42 may be achieved by a programmable logic device (e.g., an FPGA), an ASIC, a DSP and/or other circuit boards and chips. The first signal receiver 41 may include an antenna or other RF signal receivers. In another example, the first RF receiving module 40 may also include a processor (e.g., a CPU), and a memory, etc. In order to send touch signals from the electronic whiteboard 20 to the electronic terminal device 10 in the form of RF so that the electronic terminal device 10 can execute corresponding operations, FIG. 4 is a schematic composition diagram of the second RF transmission module 50. As illustrated in FIG. 4, the second RF transmission module 50 includes a data acquisition unit 51, a first data processor 52 and a second signal transmitter 53. The data acquisition unit 51 is connected with the electronic whiteboard 20 and configured to acquire the touch signals transmitted from the electronic whiteboard 20 and to transmit the acquired touch signals to the first data processor 52. The first data processor 52 is configured to pack the touch signals into data packets compatible with the wireless transmission format and to transmit the data packets to the second signal transmitter 53. The second signal transmitter 53 is configured to send the touch signals in the format of the data packets to the second RF receiving module 60. That is to say, when a user touches the electronic whiteboard 20 to produce touch input information, the electronic whiteboard 20 produces a corresponding touch signal; and the touch signal may be sent to the second RF receiving module 60 in the form of RF through the second RF transmission module 50. It should be understood that the second RF transmission module 50 may be externally connected to or disposed in the electronic whiteboard 20 according to actual demands.

For instance, the data acquisition unit 51 and the first data processor 52 may be achieved by software, hardware and/or the combination of software and hardware. For instance, the data acquisition unit 51 and/or the first data processor 52 may be achieved by a programmable logic device (e.g., an FPGA), an ASIC, a DSP and/or other circuit boards and chips. The second signal transmitter 53 may include an antenna or other RF signal transmitters. In another example, the second RF transmission module 50 may also include a processor (e.g., a CPU), and a memory, etc.

Figure 5:
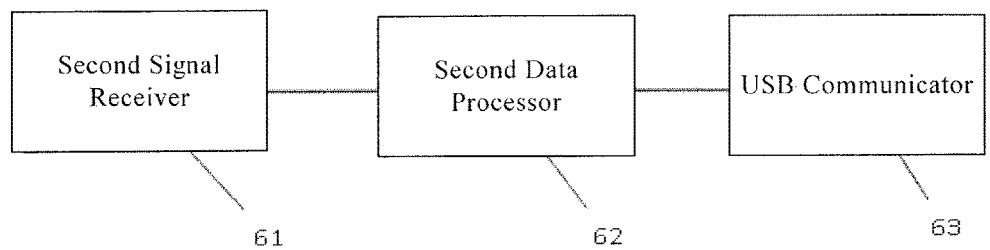
FIG. 5 is a schematic composition diagram of a second RF receiving module in an embodiment of the present disclosure.

FIG. 5 is a schematic composition diagram of the second RF receiving module 60. As illustrated in FIG. 5, the second RF receiving module 60 includes a second signal receiver 61, a second data processor 62 and a USB communicator 63, where the second signal receiver 61 is configured to receive the touch signals sent by the second RF transmission module 50 and transmit the touch signals to the second data processor 62; the second data processor 62 is configured to convert the data format of the touch signals into the data format of the HID protocol and transmit the converted touch signals to the USB communicator 63; and the USB communicator 63 is connected with the electronic terminal device 10 and configured to transmit the touch signals to the electronic terminal device 10.

Moreover, a USB data cable can be adopted for the connection between the data acquisition unit 51 and the electronic whiteboard 20 and/or the connection between the USB communicator 63 and the electronic terminal device 10. The USB data cable can support computers of all the models and can achieve rapid and stable signal transmission.

For instance, the second data processor 62 may be achieved by software, hardware and/or the combination of software and hardware. For instance, the second data processor 62 may be achieved by a programmable logic device (e.g., an FPGA), an ASIC, a DSP and/or other circuit boards and chips. The second signal receiver 61 may include an antenna or other RF signal receivers. The USB communicator 63 may include a USB communication interface. In another example, the second RF receiving module 60 may also include a processor (e.g., a CPU), and a memory, etc.

As a compatible HID protocol is adopted between the electronic terminal device 10 and the electronic whiteboard 20, the second RF transmission module 50 can send the touch signals from the electronic whiteboard 20 to the second RF receiving module 60 in the form of RF, so that the electronic terminal device 10 (e.g., the computer) can execute corresponding operations, and hence the control of the electronic terminal device 10 by the electronic whiteboard 20 can be achieved.

Figure 6:
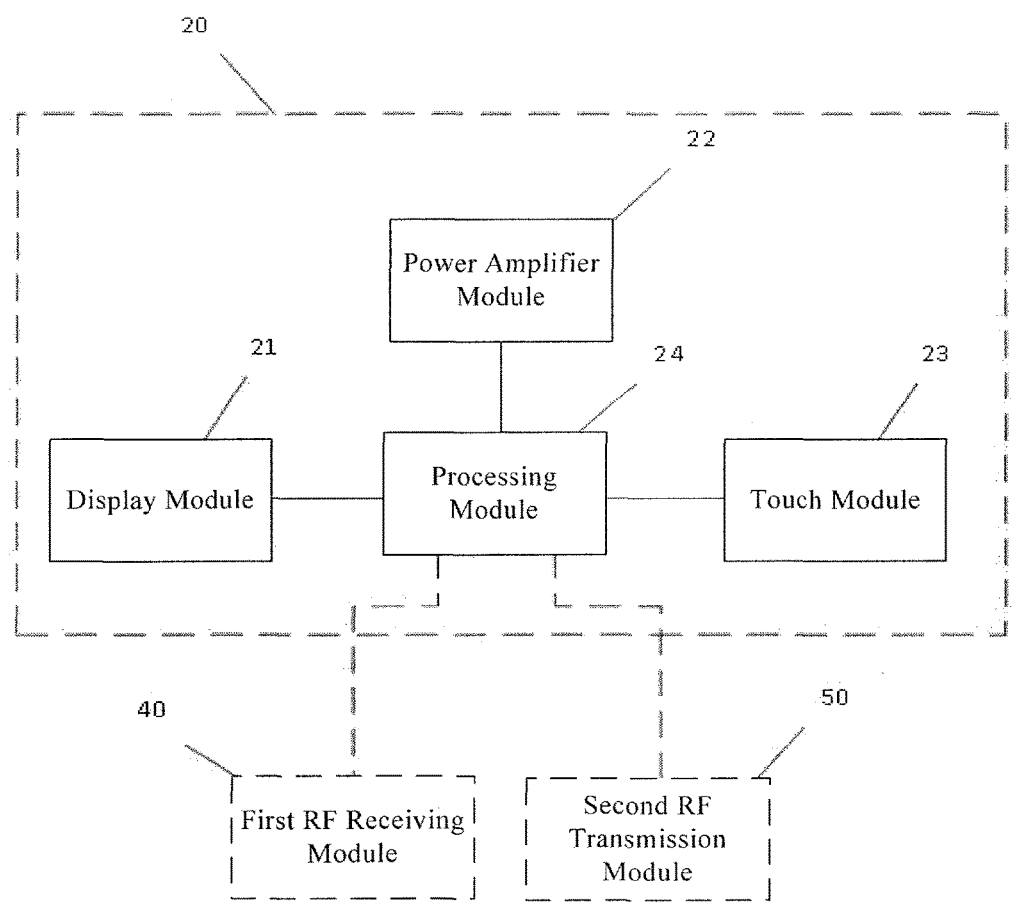
FIG. 6 is a schematic composition diagram of an electronic whiteboard in an embodiment of the present disclosure.

The electronic whiteboard 20 has video and audio play functionality and touch functionality. FIG. 6 is a schematic composition diagram of the electronic whiteboard 20. As illustrated in FIG. 6, the electronic whiteboard 20 includes a display module 21, a power amplifier module 22, a touch module 23 and a processing module 24. The display module 21, the power amplifier module 22 and the touch module 23 are all connected with the processing module 24. The video data signals sent by the electronic terminal device 10 are sent to the electronic whiteboard 20 through the first RF transmission group, then subjected to video processing by the processing module 24, and transmitted to the display module 21 for playing the corresponding video data; the audio data signals sent by the electronic terminal device 10 are sent to the electronic whiteboard 20 through the first RF transmission group, then subjected to audio processing by the processing module 24, and transmitted to the power amplifier module 22 for playing the corresponding audio data; and the touch signals sent by the touch module 23 are subjected to touch signal processing by the processing module 24 and transmitted to the electronic terminal device 10 through the second RF transmission group. For instance, both the first RF receiving module 40 and the second RF transmission module 50 are externally connected to the electronic whiteboard 20.

In some embodiments, the processing module 24 may be achieved by software, hardware and/or the combination of software and hardware. For instance, the processing module 24 may be achieved by a programmable logic device (e.g., FPGA), an ASIC, a DSP and/or other circuit boards and chips. In another example, the processing module 24 may include a processor (e.g., a CPU), and a memory, etc. The display module 21 may include a display panel or other display devices. The power amplifier module 22 may include an amplifier (e.g., a power amplifier), a loudspeaker, etc. The touch module 23 may include a touch panel. For instance, the display module 21 and the touch module 23 may be combined into a display screen having a touch function.

Figure 7:
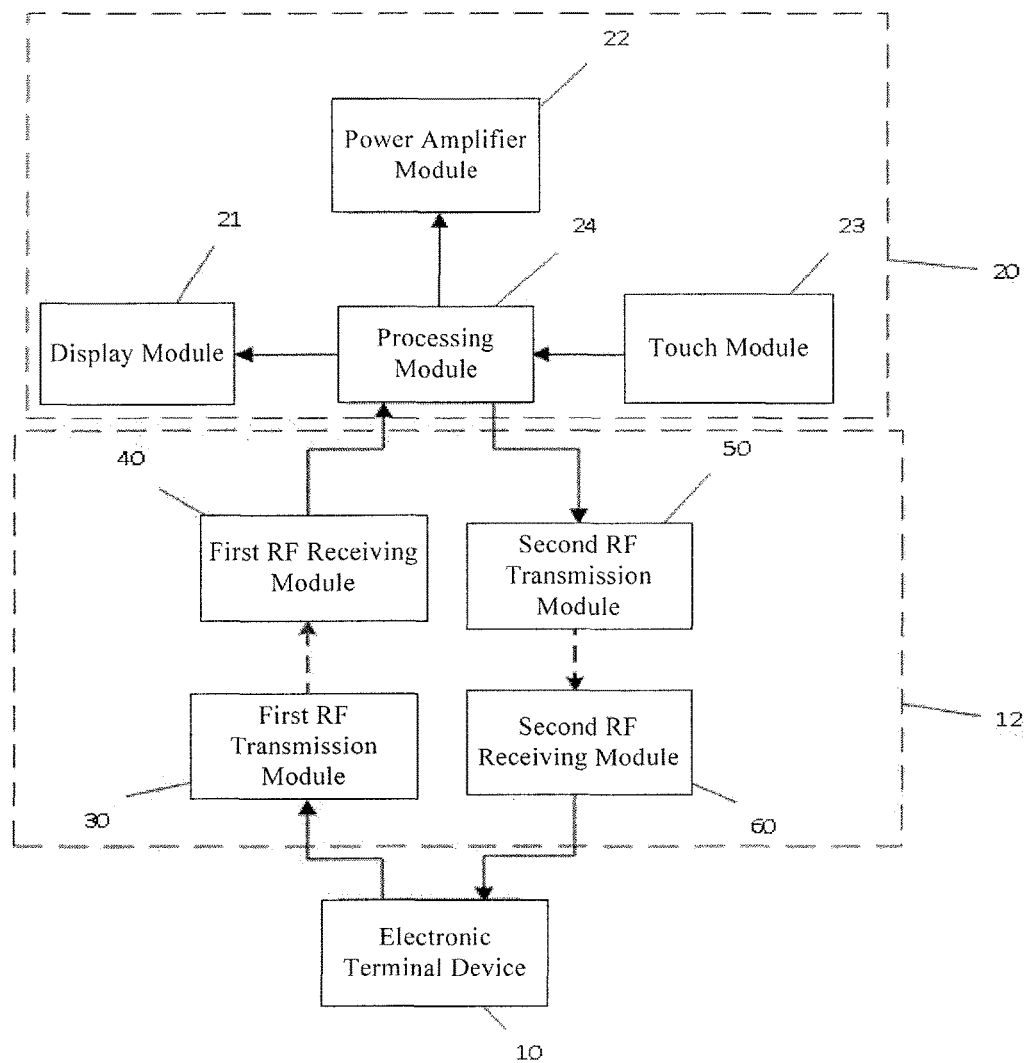
FIG. 7 is a flow graph of data signals in an electronic interactive system in an embodiment of the present disclosure.

FIG. 7 is a flow graph of the data signals in the electronic interactive system provided by an embodiment of the present disclosure. As illustrated in FIG. 7, the touch module 23 receives a touch input from the user and produces a corresponding touch signal. For instance, the touch signal is sent by the touch module 23, is processed by the processing module 24, the second RF transmission module 50 and the second RF receiving module 60 in sequence, and then arrives at the electronic terminal device 10. A video data signal is sent by the electronic terminal device 10, is processed by the first RF transmission module 30, the first RF receiving module 40 and the processing module 24 in sequence, and then arrives at the display module 21. An audio data signal is sent by the electronic terminal device 10, is processed by the first RF transmission module 30, the first RF receiving module 40 and the processing module 24 in sequence, and then arrives at the power amplifier module 22. In another example, an image data signal is sent by the electronic terminal device 10, is processed by the first RF transmission module 30, the first RF receiving module 40 and the processing module 24 in sequence, and then arrives at the display module 21, so that the display module 21 can display the image data signal.

The electronic interactive system provided by embodiments of the present disclosure is based on RF transmission. Firstly, video data signals and audio data signals from the electronic terminal device can be wirelessly transmitted to the electronic whiteboard through the first RF transmission group. Secondly, touch signals from the electronic whiteboard can be wirelessly transmitted to the electronic terminal device through the second RF transmission group. Thus, the wireless connection between the electronic whiteboard and the electronic terminal device can be achieved, and hence the electronic whiteboard can display documents in the electronic terminal device without spatial limitation. Moreover, the electronic whiteboard has touch function, so that the user can control the electronic terminal device by touching the electronic whiteboard. The user can switch the image and open other documents stored in the electronic terminal device by touching the electronic whiteboard. Thus, the mutual control between the electronic whiteboard and the electronic terminal device can be achieved, and hence convenient operation, time saving and good use effect can be achieved.

Embodiments of the present disclosure also provide a setting method of an electronic interactive system. The setting method of the electronic interactive system comprises the following steps.

Step 1: connecting a first RF transmission module and a first RF receiving module in a first RF transmission group to an electronic terminal device and an electronic whiteboard respectively via data cables of a first type (e.g., any one of an HDMI data cable, a DP data cable and a VGA data line), where an operating system of the electronic terminal device and an operating system of the electronic whiteboard each include the HID protocol, so that data signals of the electronic terminal device can be transmitted to the electronic whiteboard in the form of RF.

Step 2: connecting a second RF transmission module and a second RF receiving module in a second RF transmission group to the electronic whiteboard and the electronic terminal device respectively via data cables of a second type (e.g., USB data cables), so that touch signals of the electronic whiteboard can be transmitted to the electronic terminal device in the form of RF, and hence the mutual control of the electronic whiteboard and the electronic terminal device can be achieved.

The electronic terminal device, the electronic whiteboard, the first RF transmission group and the second RF transmission group in this embodiment are the same as or similar to the electronic terminal device, the electronic whiteboard, the first RF transmission group and the second RF transmission group as shown in FIGS. 1-7. Similar description will not be repeated here.

The above steps can be adopted to achieve the image display of the electronic terminal device on the electronic whiteboard and to achieve the control of the electronic terminal device by the electronic whiteboard. Of course, the sequence of the steps may be arbitrarily changed. The wireless transmission of the data signals between the electronic terminal device and the electronic whiteboard can all be achieved. Thus, the limitation due to wired connection can be avoided, and hence the electronic whiteboard can display the documents in the electronic terminal device without spatial limitation. Moreover, the touch signals from the electronic whiteboard can be transmitted to the electronic terminal device in the form of RF, so that the electronic terminal device can execute corresponding operations. The user can switch the displayed image and open other documents stored in the electronic terminal device by touching the electronic whiteboard. Thus, convenient operation, time saving and convenient use can be achieved.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects.

It is noted that, azimuth or positional relationships indicated by terms such as "up" and "down" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure. Unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. Those skilled in the art can understand the specific meanings of the above-mentioned terms in the embodiments of the present disclosure according to the specific circumstances.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201610105811.7 filed on Feb. 25, 2016, which is incorporated herein by reference in its entirety as part of the disclosure of the present application.

What is claimed is:

1. An electronic interactive system, comprising a wireless transmission circuit respectively connected with an electronic terminal device and an electronic whiteboard, wherein the wireless transmission circuit is configured to transmit data signals from the electronic terminal device to the electronic whiteboard in a wireless form and transmit touch signals from the electronic whiteboard to the electronic terminal device in the wireless form;

the wireless form is a form of radio frequency (RF), the wireless transmission circuit includes a first RF transmission group and a second RF transmission group, the first RF transmission group includes a first RF transmission circuit and a first RF receiving circuit, and the second RF transmission group includes a second RF transmission circuit and a second RF receiving circuit;

the first RF transmission circuit is connected with the electronic terminal device and configured to send the data signals of the electronic terminal device to the first RF receiving circuit in the form of RF;

the first RF receiving circuit is connected with the electronic whiteboard and configured to receive the data signals sent by the first RF transmission circuit and transmit the received data signals to the electronic whiteboard;

the second RF transmission circuit is connected with the electronic whiteboard and configured to send the touch signals transmitted from the electronic whiteboard to the second RF receiving circuit in the form of RF; and the second RF receiving circuit is connected with the electronic terminal device and configured to receive the touch signals sent by the second RF transmission circuit and transmit the received touch signals to the electronic terminal device, causing the electronic terminal device to execute operations corresponding to the touch signals.

2. The electronic interactive system according to claim 1, wherein:

the data signals include at least one of audio data signals or video data signals; the first RF transmission circuit includes an audio and video decoder, a signal modulator and a first signal transmitter;

the audio and video decoder is connected with the electronic terminal device, and is configured to respectively convert the audio data signals and the video data signals from the electronic terminal device into a signal form of Inter-IC Sound (I2S) and a signal form of transistor-transistor logic (TTL) processed by the signal modulator, and to transmit the converted data signals to the signal modulator;

the signal modulator is configured to modulate the audio data signals in the signal form of I2S and the video data signals in the signal form of TTL and to transmit the modulated data signals to the first signal transmitter; and the first signal transmitter is configured to send the modulated audio data signals and the modulated video data signals to the first RF receiving circuit in the form of RF.

3. The electronic interactive system according to claim 2, wherein the audio and video decoder is connected with the electronic terminal device by any one of a high-definition multimedia interface (HDMI) data cable, a display port (DP) data cable and a video graphics array (VGA) data cable.

4. The electronic interactive system according to claim 1, wherein:

the first RF receiving circuit includes a first signal receiver, a signal demodulator and an audio and video encoder; the data signals include at least one of audio data signals or video data signals;

the first signal receiver is configured to receive the data signals of the electronic terminal device sent by the first RF transmission circuit in the form of RF and transmit the received data signals to the signal demodulator;

the signal demodulator is configured to demodulate the data signals and transmit the demodulated data signals to the audio and video encoder; and the audio and video encoder is connected with the electronic whiteboard and configured to encode the demodulated data signals and then send the data signals to the electronic whiteboard.

5. The electronic interactive system according to claim 4, wherein the audio and video encoder is connected with the electronic whiteboard by any one of the HDMI data cable, the DP data cable and the VGA data cable.

6. The electronic interactive system according to claim 1, further comprising the electronic terminal device and the electronic whiteboard, wherein both the electronic terminal device and the electronic whiteboard adopt a human interface device (HID) protocol.

7. The electronic interactive system according to claim 6, wherein:

the electronic whiteboard includes a display module, a power amplifier module, a touch module and a processing module; the display module, the power amplifier module and the touch module are connected with the processing module;

the video data signals sent by the electronic terminal device are sent to the electronic whiteboard through the first RF transmission group, then subjected to video processing by the processing module, and transmitted to the display module for playing corresponding video data;

the audio data signals sent by the electronic terminal device are sent to the electronic whiteboard through the first RF transmission group, then subjected to audio processing by the processing module, and transmitted to the power amplifier module for playing corresponding audio data; and the touch signals sent by the touch module are subjected to touch signal processing by the processing module and then transmitted to the electronic terminal device through the second RF transmission group.

8. The electronic interactive system according to claim 1, wherein:

the second RF transmission circuit module includes a data acquisition unit, a first data processor and a second signal transmitter;

the data acquisition unit is connected with the electronic whiteboard and configured to acquire touch signals transmitted from the electronic whiteboard and transmit the acquired touch signals to the first data processor;

the first data processor is configured to pack the acquired touch signals into data packets that are compatible with wireless transmission, and transmit the touch signals in the format of data packets to the second signal transmitter; and the second signal transmitter is configured to send the touch signals in the format of data packets to the second RF receiving circuit.

9. The electronic interactive system according to claim 8, wherein the data acquisition unit is connected with the electronic whiteboard through a USB data cable.

10. The electronic interactive system according to claim 1, wherein:

the second RF receiving circuit includes a second signal receiver, a second data processor and a USB communicator;

the second signal receiver is configured to receive touch signals sent by the second RF transmission circuit and transmit the received touch signals to the second data processor;

the second data processor is configured to convert a data format of the touch signals into a data format compatible with a HID protocol and transmit the converted touch signals to the USB communicator; and the USB communicator is connected with the electronic terminal device and configured to transmit the converted touch signals to the electronic terminal device.

11. The electronic interactive system according to claim 10, wherein the USB communicator is connected with the electronic terminal device through a USB data cable.

12. The electronic interactive system according to claim 1, wherein the electronic terminal device includes a cellphone or a computer.

13. A setting method of the electronic interactive system accordingly to claim 1, comprising:

connecting a first RF transmission circuit and a first RF receiving circuit in a first RF transmission group to an electronic terminal device and an electronic whiteboard respectively via data cables of a first type, wherein an operating system of the electronic terminal device and an operating system of the electronic whiteboard each include a HID protocol, so that data signals of the electronic terminal device are transmitted to the electronic whiteboard in the form of RF; and connecting a second RF transmission circuit and a second RF receiving circuit in a second RF transmission group to the electronic whiteboard and the electronic terminal device respectively via data cables of a second type, so that touch signals of the electronic whiteboard are transmitted to the electronic terminal device in the form of RF, and mutual control of the electronic whiteboard and the electronic terminal device are achieved.

14. The setting method of the electronic interactive system according to claim 13, wherein the data cables of the first type include any one of an HDMI data cable, a DP data cable and a VGA data cable, and the data cables of the second type include a USB data cable.

* * * * *